United States Patent [19]

Burford

[11] 4,265,150

[45] May 5, 1981

[54] VARIABLE FOLLOWER REST FOR A LATHE

[75] Inventor: Billy R. Burford, Canon City, Colo.

[73] Assignee: Portec, Inc., Oak Brook, Ill.

[21] Appl. No.: 28,553

[22] Filed: Apr. 9, 1979

[51] Int. Cl.³ .......................... B23B 3/36; B23B 25/00
[52] U.S. Cl. ........................................ 82/17; 82/38 R
[58] Field of Search ................................ 82/17, 38 R

[56] References Cited

U.S. PATENT DOCUMENTS

| | | | |
|---|---|---|---|
| 297,418 | 4/1884 | King | 82/17 |
| 2,069,426 | 2/1937 | Smith | 82/17 |
| 2,257,503 | 9/1941 | Lange et al. | 82/17 |
| 2,506,012 | 5/1950 | Collins | 82/17 |
| 2,655,828 | 10/1953 | Hazen | 82/38 R |
| 3,091,985 | 6/1963 | Whalen | 82/38 R |
| 3,187,611 | 6/1965 | Sweet | 82/17 |

FOREIGN PATENT DOCUMENTS 764493 12/1956 United Kingdom ................... 82/38 R Primary Examiner—Harrison L. Hinson
Attorney, Agent, or Firm—Frank C. Lowe; Horace B. Van Valkenburgh

[57] ABSTRACT

A variable follower rest for a lathe for supporting tapered shafts and similar shafts of varying diameter as they are being turned. The follower rest includes a bearing arm above and another bearing diametrically opposite to the cutting tool to resist the lift and thrust of the cutting tool against the shaft. Through master-slave actuators the bearing arms move towards and away from the center of the shaft in unison with corresponding movements of the cutting tool to always engage the shaft as the diameter of the shaft varies.

9 Claims, 5 Drawing Figures

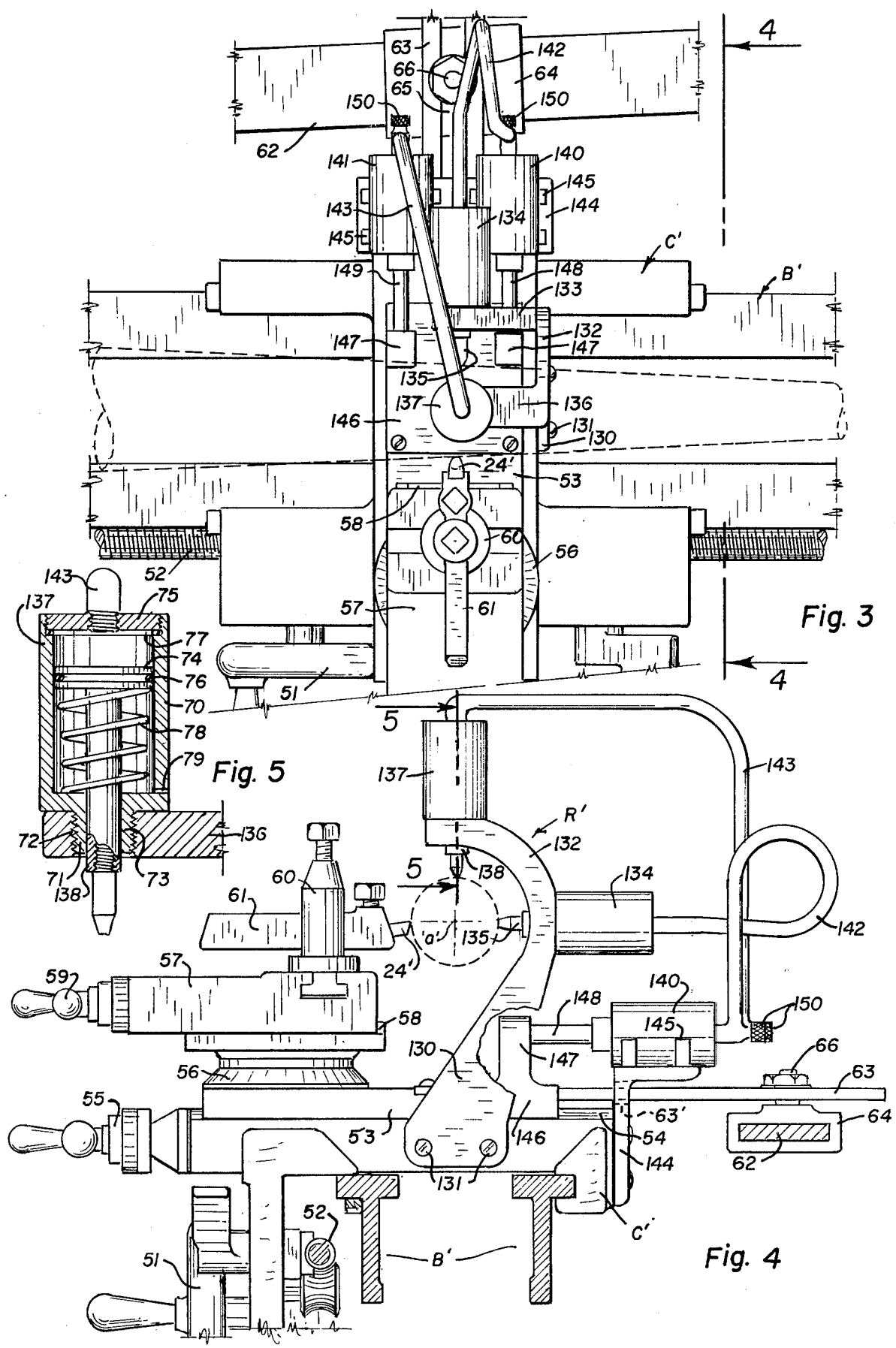

VARIABLE FOLLOWER REST FOR A LATHE

The present invention relates to turning comparatively-long, small-diameter shafts on a lathe, where a follower rest adjacent to the cutting tool is necessary to hold the workpiece and keep it from bending and chattering. The invention relates more particularly to turning comparatively long tapered shafts or the like where the crossfeed carrying the cutting tool moves upon the carriage, to vary the shaft diameter as a carriage moves along the bed of the lathe. More specifically, the invention is a variable follower rest for a lathe to hold a tapered shaft or the like as it is being turned.

A conventional follower rest is commonly used in turning constant-diameter shafts which are comparatively long with respect to their diameter. The follower rest is ordinarily mounted upon the carriage opposite to the tool carrier and includes adjustable bearing arms which engage the shaft above and opposite to the cutting tool to resist the upward and outward thrust of the cutting tool as the shaft turns. Such a follower rest cannot be used to hold a comparatively long tapered shaft as it is being turned and the turning of such tapered shafts can be an expensive operation. When necessary to provide such a tapered shaft, it may be turned as segments between steady rests affixed to the lathe bed or sometimes by many small, time-consuming cuts.

In the manufacture of belt-type conveyor turns many comparatively-long, tapered rollers are needed and turning operations to finish the rollers in a more efficient manner are needed especially when the rollers are lightweight, hollow tubular members. There has also been a growing need to hold a comparatively long workpiece in a better manner in modern lathes, in which the diameter of the cut shaft may be varied along the reach of the shaft by using computer technology and shifting the tool-carrying crossfeed of the lathe according to a selected specification which may be a taper or any other pattern.

The present invention was conceived and developed with the foregoing and other considerations in view and the invention comprises, in essence, a variable follower rest having: a curved framework upstanding from the crossfeed of the carriage to partially extend about and over a workpiece; slave actuators mounted in the framework having extendible gearing arms which will engage the workpiece above and opposite to the tool on the carriage; opposing mount abutments on the carrier and on the crossfeed which will come together and move apart as the crossfeed moves transversely on the carriage to vary the position of the cutting tool on the crossfeed, as to cut a tapered shaft; master actuators carried between the mount abutments to drive the slave actuators to move the bearing arms towards and away from the axis of the workpiece in unison with the movement of the cutting tool carried on the crossfeed to hold the workpiece at all times. It is to be noted that the actuators are hereinafter described as hydraulic cylinders but conceivably, the actuators could be mechanical, or mechanical-electrical devices.

It follows that the objects of the present invention are to provide a novel and improved variable follower rest for a lathe which: (a) simplifies the turning of comparatively long tapered shafts and the like; (b) simplifies the turning of comparatively long shafts having varying diameters along the shaft where movement of the crossfeed is necessary as the carriage moves along the lathe bed; (c) can be adapted for use with any types of lathes; (d) can be used with any selected type of crossfeed mechanism, such as a computerized unit, or a taper attachment, or even where the crossfeed is shifted manually; (e) may be formed as a simple, rugged unit; and (f) is a low-cost economical apparatus when used in production operations.

With the foregoing and other objects in view, my invention comprises certain constructions, combinations, and arrangements of parts and elements as hereinafter described, defined in the appended claims and illustrated in preferred embodiments in the accompanying drawing in which:

FIG. 3 is a plan view of the carriage and a portion of a lathe bed of another type of lathe which uses a taper attachment for cutting a tapered shaft, and incorporates therein the variable follower rest.

FIG. 4 is a transverse elevational view as taken from the indicated line 4—4 at FIG. 3.

FIG. 5 is a fragmentary sectional detail as taken from the indicated line 5—5 at FIG. 4.

Figure 1:
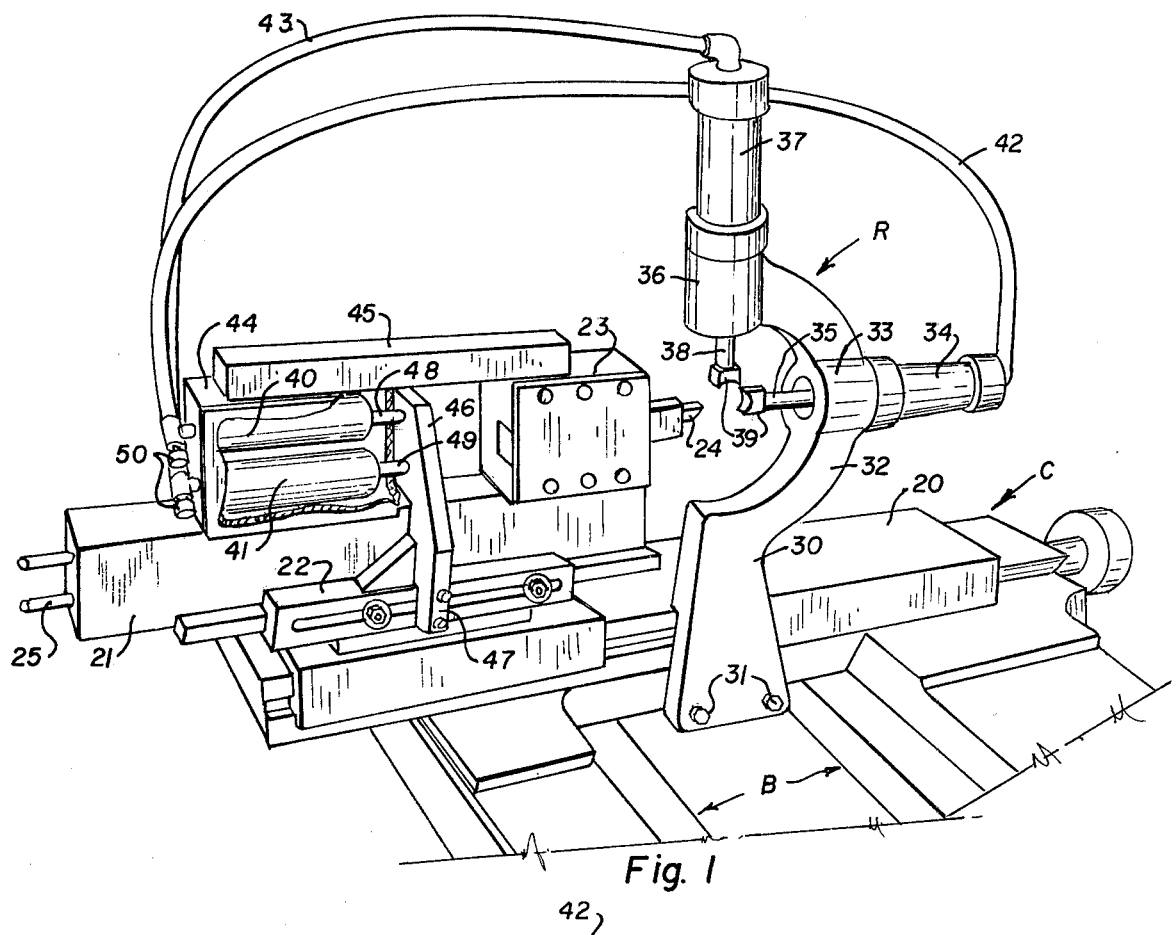
FIG. 1 is a perspective view of the carriage assembly of a lathe set up for cutting a tapered shaft by using a computerized crossfeed and incorporating therewith the variable follower rest, and with a cover plate broken away to show parts otherwise hidden from view.

Referring more particularly to the drawing, FIG. 1 shows the carriage C of a production lathe set up for cutting a tapered shaft or the like. The carriage will move along the ways of a lathe bed B and the rectangular crossfeed plate 20 of the carriage is locked on the carriage. For cross movement, a supplementary hydraulic, box-shaped crossfeed 21 is supported in ways 22 affixed to the plate 20. The hydraulic crossfeed 21 carries a tool head 23 at its inner end and a tool 24 is mounted in the head. This crossfeed 21 moves upon the plate 20 and a computer, not shown, controls pressure in hydraulic lines 25 connecting with the crossfeed 21 to actuate the crossfeed 21 to move the tool 24 towards or away from the axis of a workpiece in the lathe as a carriage C moves along the lathe bed B. The hydraulic lines 25, in turn, connect with cylinders within the box-shaped crossfeed 21. However, such cylinders are not shown nor further described since the crossfeed 21, the manner in which it is supported and the manner in which it carries its components and the tool head 23, are conventional.

The variable follower rest R includes a standard 30 which is secured to a side of the carriage C at a suitable location between the ways of the lathe bed, as by bolts 31 as illustrated. This standard upstands from the carriage to form a semi-circular arcuate portion 32 which extends about and above a workpiece in the lathe at the side opposite to the cutting tool 24 of the lathe. This arcuate portion 32 is centered about the workpiece axis, hereinafter sometimes called the lathe axis. It includes a radially disposed tubular enlargement 33 at the horizontal position wherein a cylinder 34 is mounted. The piston rod 35 of this cylinder extends radially towards the lathe axis at the side of the tool 24 to function as a bearing arm to engage the workpiece and resist the normal thrust of the tool 24 against the workpiece. The arcuate portion 32 also includes a radially disposed tubular enlargement 36 at the top position wherein a cylinder 37 is mounted. The piston rod 38 of this cylinder extends radially downwards towards the lathe axis to function as a bearing arm to engage the workpiece and resist the upthrust of the tool 24 as it cuts into workpiece. Thus, the extended ends of the piston rods 35 and 38, hereinafter sometimes called the bearing arms, will engage the rotating workpiece in the lathe to hold it in position. The ends of these bearing arms may include friction pads 39, as illustrated, or these ends may be otherwise shaped as with hardened or anti-friction faces to engage smaller surface areas of the workpiece, or the ends may even be provided with wheels to reduce friction to a minimum.

Once properly set, the bearing arms 35 and 38 extend and retract toward and away from the lathe axis in unison with a corresponding movement of the tool 24, and the arms will ride against a workpiece to hold it steady during cutting by the tool regardless of the change of diameter as the carriage moves along the bed, as in cutting a taper. This movement is effected by hydraulic action in the cylinders 34 and 37 extending their respective positions, i.e. the bearing arms 35 and 38. The cylinders 34 and 37 may be referred to as slave cylinders and they are connected with master cylinders 40 and 41, respectively, by lines 42 and 43, respectively.

The master cylinders 40 and 41 are mounted in a structural container 44 carried upon the outer or rearward end of the supplementary crossfeed 21 with a suitable reinforcing bar 45 connecting the top of the tool head 23 with the top of the container 44. It is to be noted that a space between the container 44 and the tool head 23 is necessary and this space must exceed the total movement of the supplementary crossfeed and tool 24, from a maximum to a minimum diameter cut, a distance sufficient to allow also for the thickness of a stationary crossplate 46. This crossplate 46 has lower legs 47 bolted to the fixed ways 22, as shown at one side of the apparatus, and the crotch between the legs 47 straddles the supplementary crossfeed 21. The piston rods 48 and 49, of the cylinders 40 and 41 respectively, are attached to this crossplate 46. To complete this master-slave arrangement, suitable valves 50 are provided at the lines 42 and 43 to permit the injection and removal of hydraulic fluid in each unit. This permits bleeding off air bubbles from the system and also permits proper adjustment of the pistons, the bearing arms 35 and 38, with respect to the cutting tool 24.

Figure 2:
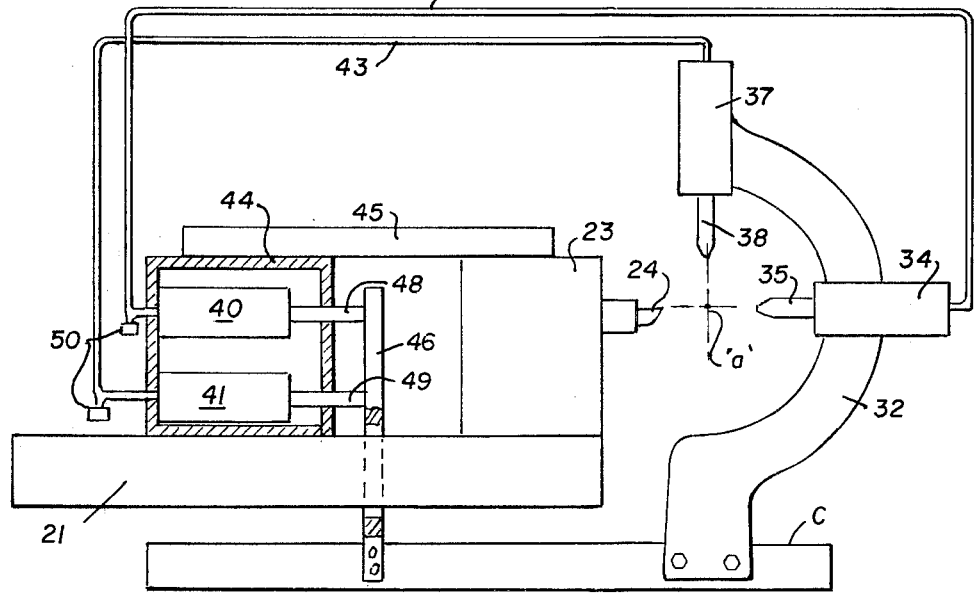
FIG. 2 is a diagram of the mechanisms constituting the follower rest shown at FIG. 1.

The operation of this apparatus is best described by referring also to the diagram, FIG. 2. Whenever the tool 24 moves towards the lathe axis 'a,' the master cylinders 40 and 41 are moved over their respective pistons 48 and 49 to pump fluid through lines 42 and 43 and into the slave cylinders 34 and 37. This fluid flow extends the pistons, the bearing arms 35 and 38, a distance equal to the movement of the tool 24. A corresponding movement occurs whenever the tool 24 moves away from the lathe axis 'a,' for then the master cylinders 40 and 41 move away from their respective pistons 48 and 49 to pull fluid from the slave cylinders 34 and 37. This fluid movement retracts the pistons, the bearing arms 35 and 38, a distance equal to the movement of the tool 24. These cylinders are all of a single-action type and are preferably spring loaded to bias the pistons to a retracted position. It is also essential that the cylinders of each master-slave pair be exactly the same diameter so that the master-slave piston movements are identical. A suitable cylinder construction is illustrated at FIG. 5 and hereinafter described.

The valves 50 are not described since several conventional types may be used. They must permit fluid to be injected into or bled from each set of cylinders. For convenience, they may be located in the lines 42 and 43 at positions other than that shown. These valves may be used for setting the bearing arms 35 and 38 at proper positions with respect to the tool 24 as heretofore indicated. To do so, a rigid, round shaft may be mounted in the lathe and the tool 24 then moved close to a cutting position, say, for example, ⅛-inch from the surface of the shaft. Sufficient fluid is then injected into the lines 42 and 43 to move the bearing arms 35 and 38 against the shaft. Then the tool may be advanced to a cutting position against the shaft with the valves 50 cracked to permit a necessary small leakage of fluid. They will be subsequently closed when the tool 24 is in position against the shaft.

In cutting a tapered shaft or the like with the variable follower rest, it may be desirable to offset the bearing arms 35 and 38 a slight distance from the tool position so that the friction pads 39 will engage the surface of the shaft which has been freshly cut by the tool.

The lathe portions shown at FIGS. 3 and 4 depict a lathe type which is more commonly used for manual operations. The carriage C' is mounted upon the ways of the bed B' to be moved along these ways by a hand crank 51 at the operator side, or front, of the lathe, or by a lead screw 52 alongside the ways of the bed. A crossfeed plate 53 is shiftably mounted upon this carriage in ways 54. A lead screw between these ways, not shown, terminating as a hand crank 55 moves the feed plate 53 across the carriage. A protractor head 56 is pivotally mounted upon the feed plate 53 to be set and locked thereon at any selected angular position with respect to the carriage. A tool carrier 57 is shiftably mounted upon this protractor head 56 in ways 58. A lead screw between these ways, not shown, terminating as a hand crank 59 moves the tool carrier 57 on the protractor head. A tool post 60 upstands from this head to carry a tool bar 61 wherein a tool 24 is mounted. This assembly need not be described in further detail since it is conventional.

To cut a tapered shaft on this lathe a taper attachment is used. This attachment includes a horizontally disposed slide bar 62 at the back side of the lathe. Each end of this is affixed to the lathe bed by arms, not shown. This slide bar 62 is angled with respect to the lathe bed a degree corresponding to the taper to be cut. To use the taper attachment, the lead screw between the ways 54 is disconnected from the crossfeed plate 53 to permit the crossfeed plate to freely slide in the ways 54. A holding bar 63 is attached to the crossfeed plate 53 and to a slide 64 carried upon the bar 62. A slot 65 in the holding bar 63 permits an adjustable connection with the slide 64 as by a locknut 66. This taper attachment, being conventional, need not be described in further detail.

A variable follower rest P' for this lathe is basically the same as the unit heretofore described. A standard 130 is secured to a side of the carriage C between the ways of the lathe bed as by bolts 131 to extend upwardly as a semicircular, arcuate portion 132. A horizontal offset 133 is provided on this portion 132 and a cylinder 134 is mounted on this offset. Its piston rod, a bearing arm 135, extends radially towards the lathe axis opposite to the tool 124. An offset 136 is provided at the top of the arcuate portion and a cylinder 137 is mounted therein with its piston rod, a bearing arm 136, extending downwardly towards the lathe axis.

The cylinders 134 and 137, the slave cylinders, are connected with their respective master cylinders 140 and 141 by respective hydraulic lines 142 and 143. These master cylinders are mounted at each side of the carriage upon an angle bracket 144 affixed to the rear side of the carriage C'. A slot 63' in the bracket 144 is provided to permit the holding bar 63 to extend through the bracket as shown in dotted lines at FIG. 4. Suitable clamps 145 hold the cylinders 140 and 141 in place at each side of the carriage C'. A crossfeed extension plate 146 fits upon the ways 54 and is attached to the crossfeed plate 53. The plate 146 includes a pair of posts 147, one at each side of the plate 146, to connect with the piston rods 148 and 149 of the respective cylinders 140 and 141. To complete this organization, suitable valves 150 are connected to the lines 142 and 143.

Although the master cylinders 140 and 141 are affixed to the carriage C' while their pistons 148 and 149 are mounted on the crossfeed to move as the crossfeed 53 moves to shift the cutting tool 124, the action of the master and slave cylinders is the same as heretofore described. The bearing arms 135 and 138 will respond to move in unison with the tool movement towards and away from the lathe axis 'a,' as heretofore described.

The cylinder 137, shown at FIG. 5, is of a type which may be used with the invention and is representative of all of the cylinders 34, 37, 134 and 137 mentioned. It is formed as a cup shaped body 70 having an extended threaded boss 71 which fits into a threaded socket 72 in the offset 136 to hold the cylinder in place. A passageway 73 in the boss guides the piston rod 138 with the piston 74 in the cylinder thereabove. The top of the cylinder is closed by a cup 75 wherein the line 143 is connected. A suitable O-ring 76 on the piston and a seal 77 at the cup makes for a leakproof fit. The chamber between the piston and the base of the cylinder includes a spring 78 to bias the piston to a retracted position and a small vent 79 may be provided to prevent an accumulation of air pressure in this chamber when the piston rod is extended. A similar cylinder-piston construction may be used for the cylinders 40, 41, 140 and 141.

I have now described my invention in considerable detail. It is obvious, however, that others skilled in the art can devise and build alternate and equivalent constructions which are within the scope and spirit of the invention. Hence, I desire that my protection be limited, not by the details herein described but only by the proper spirit and scope of the appended claims.

What is claimed is:

1. In combination with a lathe having a carriage, a crossfeed and a cutting tool on the crossfeed, a variable follower rest mounted on the carriage for supporting a tapered shaft, or the like, when it is being turned, comprising:
   (a) a standard affixed to the carriage to extend upwardly therefrom to a position alongside the shaft opposite to the position of the cutting tool;
   (b) a shiftable bearing arm means mounted upon the standard adapted to engage the shaft and to hold the shaft against the pressure of the cutting tool as the shaft is being turned, including a generally horizontal bearing arm which is radially disposed with respect to, and directed towards, the shaft axis at the side opposite the crossfeed cutting tool;
   (c) a shifting means adapted to shift the bearing arm means towards and away from the shaft axis responsive to, and in unison with, the movement of the crossfeed and its cutting tool towards and away from the shaft axis, including a master cylinder and a slave cylinder for said bearing arm means;
   (d) an abutment means on the carriage;
   (e) an abutment means on the crossfeed in alignment with the carriage abutment means with respect to crossfeed movement; and
   (f) said master cylinder having a piston and a piston rod, with said master cylinder and its piston rod being disposed between the carriage abutment means and the crossfeed abutment means whereby to move said piston rod into and out of the master cylinder responsive to movements of the crossfeed upon the carriage and thereby pump fluid into and out of said slave cylinder.

2. The variable, follower rest defined in claim 1, wherein:
   (a) the standard includes a semi-circular arcuate portion about and above the shaft position at the side opposite to the crossfeed cutting tool.

3. The variable follower rest defined in claim 1, wherein said shifting means includes:
   (a) a generally horizontally disposed slave cylinder mounted upon the standard, in which cylinder is a piston carrying the generally horizontal bearing arm; and
   (b) a generally vertically disposed slave cylinder mounted upon the standard in which cylinder is a piston carrying the generally vertical bearing arm.

4. The variable follower rest defined in claim 3, wherein said shifting means includes:
   (a) a pair of master cylinders, one for each slave cylinder; and
   (b) a fluid line between each master cylinder and its respective slave cylinder.

5. The variable follower rest defined in claim 4, wherein:
   (a) the carriage abutment means includes a bracket and the master cylinders are mounted thereon side-by-side, and
   (b) the crossfeed abutment means includes posts connecting with the piston rods of said cylinders.

6. The variable follower rest defined in claim 4, wherein:
   (a) the crossfeed abutment means includes a wall plate and the master cylinders are mounted thereon side-by-side; and
   (b) the carriage abutment means includes a wall plate opposing the crossfeed wall plate and the piston rods of the master cylinders are connected to said crossfeed wall plate.

7. In combination with a lathe having a carriage, a crossfeed and a cutting tool on the crossfeed, a variable follower rest mounted on the carriage for supporting a tapered shaft, or the like when it is being turned, comprising:
   (a) a standard affixed to the carriage to extend upwardly therefrom to a position alongside the shaft opposite to the position of the cutting tool;
   (b) a shiftable bearing arm means mounted upon the standard adapted to engage the shaft and to hold the shaft against the pressure of the cutting tool as the shaft is being turned;
   (c) a shifting means adapted to shift the respective bearing arm means towards and away from the shaft axis responsive to, and in unison with, the movement of the crossfeed and its cutting tool towards and away from the shaft axis;

(d) said shiftable bearing arm means including a bearing arm carried by the piston of a slave cylinder and extending radially towards the shaft axis of the lathe to engage a shaft therein;

(e) said shifting means including a master cylinder having a cylinder body and a piston rod mounted between abutment means carried on the carriage and the crossfeed to extend and retract the piston rod thereof as the crossfeed moves on the carriage; and (f) a fluid line connecting the master cylinder to the slave cylinder.

8. The variable follower rest defined in claim 7, wherein the bearing arm includes a friction pad at its end which engages said shaft.

9. In combination with a lathe having a carriage, a crossfeed and a cutting tool on the crossfeed, a variable follower rest mounted on the carriage for supporting a tapered shaft or the like, when it is being turned, comprising:

(a) a standard affixed to the carriage to extend upwardly therefrom to a position alongside the shaft opposite the position of the cutting tool;

(b) a first shiftable, generally horizontal bearing arm means radially disposed with respect to and directed generally horizontally toward the shaft axis at the side opposite to the crossfeed cutting tool;

(c) a second shiftable bearing arm means radially disposed with respect to and directed generally downwardly toward the shaft axis from above;

(d) first and second master cylinders mounted so as to be responsive to movements of the crossfeed on the carriage, each said master cylinder having a piston and piston rod whose position is changed due to the movement of the crossfeed on the carriage and thereby push fluid from or fluid back into the cylinder;

(e) a first and second slave cylinder having a piston carrying the bearing arm of the respective first and second bearing arm means;

(f) a first fluid line connecting the first master cylinder with the first slave cylinder so as to move the piston of said first slave cylinder in response to movement of said piston of said first master cylinder; and (g) a second fluid line connecting the second master cylinder with the second slave cylinder so as to move the piston of said second slave cylinder in response to movement of the piston of said second master cylinder.

* * * * *